United States Patent
Schnaibel et al.

[11] Patent Number: 5,715,676
[45] Date of Patent: Feb. 10, 1998

[54] METHOD AND APPARATUS FOR MONITORING THE STARTING BEHAVIOR OF A CATALYTIC CONVERSION SYSTEM IN AN AUTOMOTIVE VEHICLE

[75] Inventors: Eberhard Schnaibel, Hemmingen; Erich Schneider, Kirchheim; Wolfgang Richter; Axel Stuber, both of Ludwigsburg; Bernd Heppner, Schwieberdingen, all of Germany

[73] Assignee: Robert Bosch GmbH, Stuttgart, Germany

[21] Appl. No.: 303,117

[22] Filed: Sep. 8, 1994

[30] Foreign Application Priority Data

Sep. 13, 1993 [DE] Germany ............... 43 30 997.6

[51] Int. Cl.$^6$ ............................................. F01N 3/20
[52] U.S. Cl. ............................ 60/274; 60/276; 60/277; 60/284; 60/285
[58] Field of Search ............... 60/274, 276, 277, 60/284, 285

[56] References Cited

U.S. PATENT DOCUMENTS

| 2,937,490 | 5/1960 | Calvert | 60/284 |
| 5,060,473 | 10/1991 | Nakagawa | |
| 5,060,474 | 10/1991 | Aramaki | |
| 5,261,230 | 11/1993 | Yuuki | 60/284 |
| 5,345,761 | 9/1994 | King | 60/284 |
| 5,390,493 | 2/1995 | Fujishita | 60/284 |

FOREIGN PATENT DOCUMENTS

| 42 11 092 | 10/1993 | Germany. |
| 42 11 092 A1 | 10/1993 | Germany. |
| 4 060 106 | 2/1992 | Japan. |

*Primary Examiner*—Douglas Hart
*Attorney, Agent, or Firm*—Kenyon & Kenyon

[57] ABSTRACT

A method for monitoring the starting behavior of a catalytic conversion system by placing an apparatus in the exhaust-gas pipe of an internal combustion engine. The conversion power of the starting region can be determined from the temperature which results when an air/fuel mixture is fed to the catalytic conversion system.

20 Claims, 4 Drawing Sheets

METHOD AND APPARATUS FOR MONITORING THE STARTING BEHAVIOR OF A CATALYTIC CONVERSION SYSTEM IN AN AUTOMOTIVE VEHICLE

FIELD OF THE INVENTION

The present invention relates to a method and apparatus for monitoring the starting behavior of a catalytic conversion system in an automotive vehicle.

BACKGROUND INFORMATION

A method and apparatus for monitoring the starting behavior of a catalytic conversion system are known from German Patent No. 42 11 092. In that case, the operability of the catalytic converter is based on the temperature at which the catalytic converter starts to convert. In one variant, under predetermined operating conditions, the period of time before the catalytic converter starts to convert is determined. The operability of the catalytic converter is determined based on this period of time. In another variant, the temperature of the catalytic converter is estimated by means of a model for a fully functional catalytic converter and the actual functionality of the catalytic converter is determined by comparison with the actual temperature of the catalytic converter.

SUMMARY OF THE INVENTION

Newly licensed motor vehicles must satisfy certain requirements with respect to their emission of pollutants. Legislation prescribes certain driving tests in which the pollutants emitted are collected. The collected masses of pollutants must not exceed certain maximum values. In modern automotive vehicles the greatest amount of pollutants are produced during the warming-up. In order to comply with strict exhaust-gas regulations, it is therefore necessary to minimize the emissions during the warming-up. This goal can be achieved by feeding as much heat as possible to the catalytic conversion system already at an early point after the starting of the internal combustion engine, so that the catalytic conversion system starts up (i.e. starts to convert) as rapidly as possible. This can be achieved by installation close to the engine, by electric heating, or by other temperature-increasing measures, such as retarded ignition, etc.

In a method in accordance with the present invention for monitoring the starting behavior of a catalytic conversion system in the exhaust pipe of an internal combustion engine, the temperature of the starting region of the catalytic conversion system is detected (i.e. of the region which primarily controls the warming-up emissions). A mixture of air and fuel is fed to the catalytic conversion system and the response behavior of the catalytic conversion system is evaluated based on the effects which the feeding of the air/fuel mixture has on the temperature of the starting region. This procedure is particularly advantageous because in modern automotive vehicles a large proportion of the injurious substance are produced during the warming-up, and the starting behavior of the catalytic conversion system has a particularly great effect on the emission of pollutants.

Another advantage of the method of the present invention is that evaluation of the starting behavior of the catalytic conversion system is not carried out during the starting but only later on when the catalytic conversion system is fully ready for operation so that the method of the invention does not produce any additional emissions of pollutants during the warming-up phase which is particularly critical for the exhaust gas standards prescribed by law. Furthermore, the greatest part of the raw emissions of the catalytic conversion system which are produced using the method of the present invention is converted, since even a catalytic conversion system having a damaged starting region will still have individual regions of good conversion power.

The evaluation of the starting behavior of the catalytic conversion system is effected based on the difference between the temperature of the starting region and a reference value. Furthermore, the first and/or second derivative with respect to time of the temperature of the catalytic converter can also be taken into consideration in the evaluation, which leads to a particularly high reliability of the method of the present invention and permits its use under different operating conditions.

It is particularly advantageous to carry out the method of the present invention when the internal combustion engine is idling because the emission of nitrogen oxide can then be kept particularly low.

Furthermore, there is the advantage that the method of the present invention can be used both as part of an "on-board diagnosis" and as part of a shop diagnosis.

DETAILED DESCRIPTION

In order to obtain low emissions of hydrocarbons and carbon monoxide, it is generally sufficient to cause the region of the catalytic conversion system which is first passed through by the exhaust gases, and is thus controlling for the warming-up emissions, to convert in a relatively slight depth. This region is referred to below as the starting region. Conversely, the amount of pollutants in the exhaust gas become worse when the starting region of the catalytic conversion system becomes increasingly inactive due to aging influences (i.e. when the conversion power of the starting region decreases). The aging of a small region of the catalytic conversion system has a greater effect as the permissible emission of pollutants becomes lower.

The starting behavior of the catalytic conversion system is evaluated based on the conversion power in the starting region. If the catalytic conversion system consists of a pre-catalytic converter and a main catalytic converter, then the conversion power of the pre-catalytic converter is determined in order to evaluate the starting behavior. However, if there is no pre-catalytic converter, then the conversion power of the front region of the main catalytic converter is, as a rule, determined.

Figure 1:
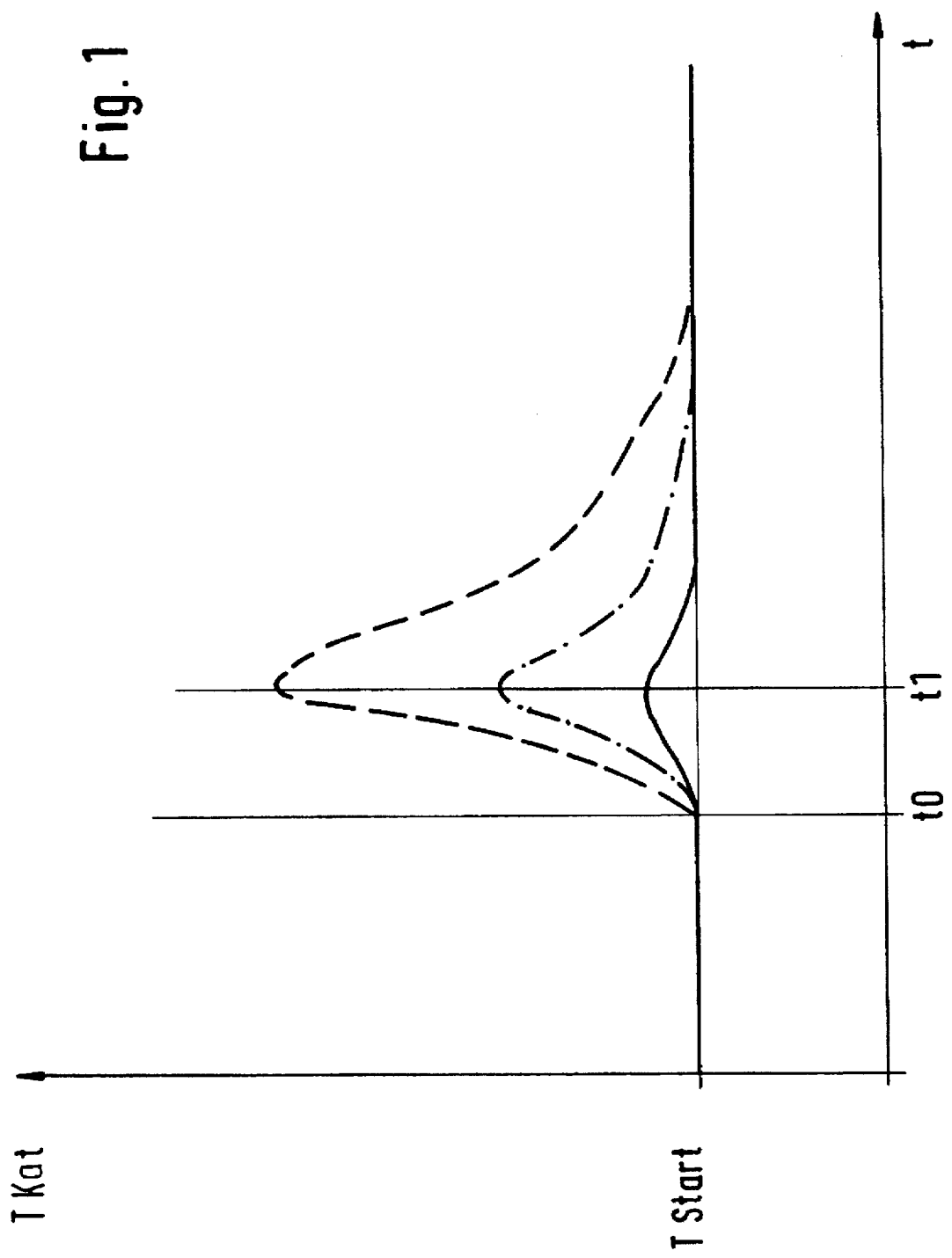
FIG. 1 shows a graph of the temperature in the starting region of a catalytic conversion system upon the feeding of a mixture of fuel and air for three catalytic conversion systems of different age.

Referring to FIG. 1, there is shown a graph depicting the time variation of the temperature TKat of the starting region for three catalytic conversion systems of different conversion power. The time t is plotted on the abscissa and the temperature TKat of the starting region of the catalytic conversion system is plotted on the ordinate. During the entire time interval which is shown in FIG. 1, the internal combustion engine is operating at idle and the catalytic conversion systems are at operating temperature. From the time t=t0 to the time t=t1, a mixture of air and fuel is fed to the catalytic conversion systems. Further details concerning the production of the air-fuel mixture are described below. The course of the temperature as from the time t=t0 depends on the conversion power of the starting region of the catalytic conversion system in question, since thermal energy is liberated upon the conversion.

The solid line represents a catalytic conversion system of very low conversion power in the starting region, the dash-dot line represents a catalytic conversion system with average conversion power in the starting region, and the dashed line represents a catalytic conversion system of very high conversion power in the starting region. For times t<t0, the three temperature courses are identical and the temperature TKat of the starting region is constant (TKat=TStart). As from the time t=t0, the courses of the temperature differ greatly from each other. Depending on how high the conversion power of the starting region of the catalytic conversion system is, a small or a large amount of the air/fuel mixture is converted. The energy liberated upon the conversion leads to a heating of the catalytic conversion system, the extent of the heating depending on the amount converted.

Accordingly, the temperature increases as from the time t=t0, increasing more strongly the greater the conversion power in the starting region of the catalytic conversion system. In the catalytic conversion system of very low conversion power in the starting region, only a slight increase in temperature as from the time t=t0 can be noted (solid line). In the catalytic conversion system with very high conversion power in the starting region, on the other hand, there is a very strong increase in temperature as from the time t=t0 (dashed line). The catalytic conversion system of medium conversion power in the starting region lies between these two extremes (dash-dot line). As soon as the feeding of the air/fuel mixture is interrupted at the time t=t1, the heating process ends and the temperature TKat of the starting region drops gradually to the value TStart which it had before the heating.

The different increase in temperature described here can be used to determine the conversion power of the starting region of the catalytic conversion system. The difference between the temperature TKat of the starting region and a reference value TRef and/or the first and/or the second derivative with respect to time of the course of the temperature can be evaluated. The reference value TRef is the temperature which would prevail without the rise of temperature in the starting region which is caused by the conversion. The evaluation of the abovementioned values can be effected by comparison of the actual values with stored threshold values. In this connection, it is to be noted that the actual and the stored threshold values refer in each case to the same time relative to the time t0.

Figure 2:
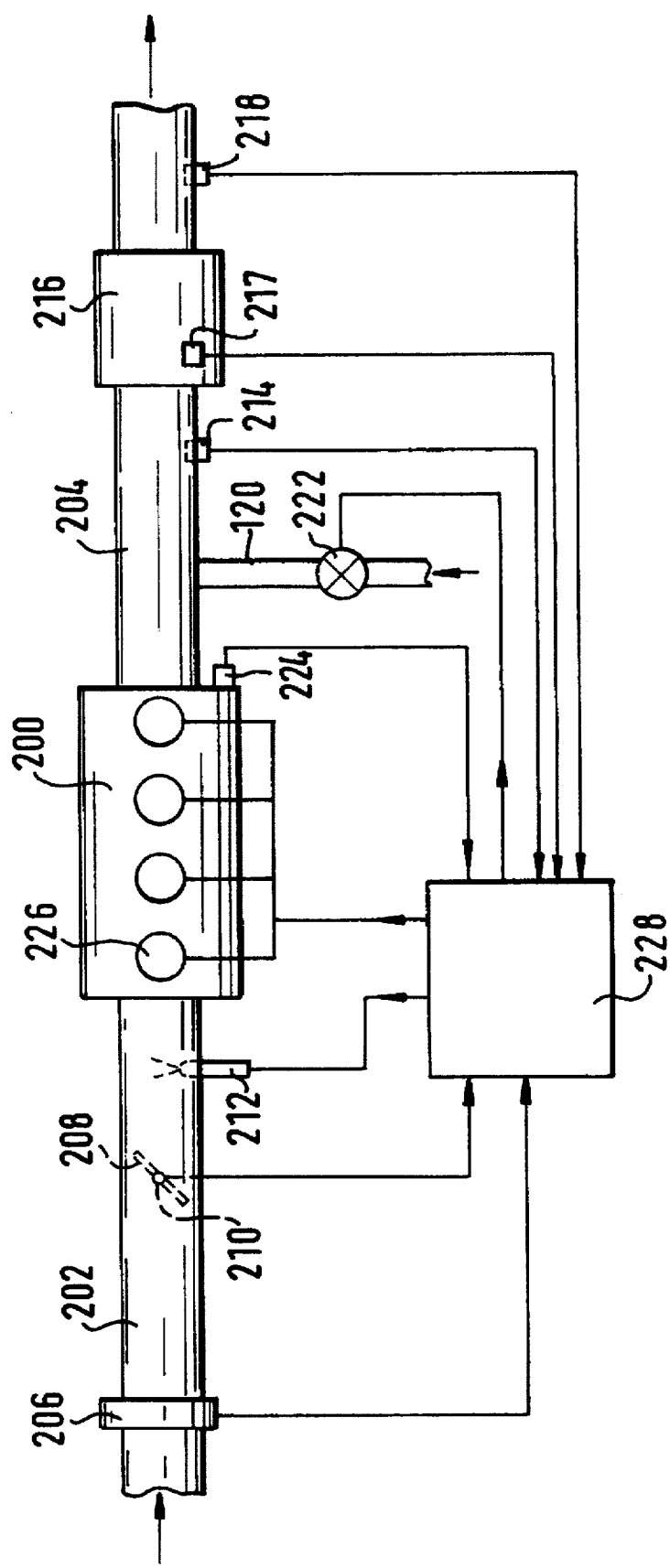
FIG. 2 illustrates an internal combustion engine and a few components which are of importance in connection with the present invention.

Referring now to FIG. 2, there is shown a diagram of an internal combustion engine 200 which includes various components which are of importance in connection with the invention. An air/fuel mixture is fed to the internal combustion engine 200 through a suction path 202 and the exhaust gases are delivered into an exhaust-gas pipe 204. In the suction path 202, there are arranged seen in the direction of flow of the air drawn in, an air-volume meter or air-weight meter 206, for example, a hot-film air-weight meter, a throttle value 208 having a sensor 210 for detection of the angle of opening of the throttle value 208, and one or more injection nozzles 212. In the exhaust-gas pipe 204, there are arranged, seen in the direction of flow of the exhaust gas, a first oxygen sensor 214, a catalytic conversion system 216 having a temperature sensor 217, and a second oxygen sensor 218.

Upstream of the first oxygen sensor 214, a secondary air line 120 debouches into the exhaust-gas pipe 204. Fresh air can be blown into the exhaust-gas pipe 204 through the secondary air line 120 by means of a secondary air pump 222. A speed of rotation sensor 224 is arranged on the internal combustion engine 200. The internal combustion engine 200 furthermore has, for instance, four spark plugs 226 for the igniting of the air/fuel mixture in the cylinders. The output signals of the air-volume meter or air-weight meter 206, of the sensor 210 for the detection of the opening angle of the throttle value 208, of the first oxygen sensor 214, of the temperature sensor 217, of the second oxygen sensor 218, and of the speed-of-rotation sensor 224 are fed to a central control unit 228 via corresponding connecting lines. The control unit 228 evaluates the sensor signals and, via additional connecting lines, controls the injection nozzle or nozzles 212, the secondary air pump 222, and the spark plugs 226.

For the carrying out of the method of the present invention, it is not absolutely necessary for all the components shown in FIG. 2 to be present simultaneously. Depending on the embodiment, one or the other component can be dispensed with. One component which is particularly important for the method of the invention is the temperature sensor 217. It serves to detect the temperature in the starting region of the catalytic conversion system 216. Details concerning the arrangement of this temperature sensor 217 in the catalytic conversion system 216 are shown in FIG. 3.

Figure 3A:
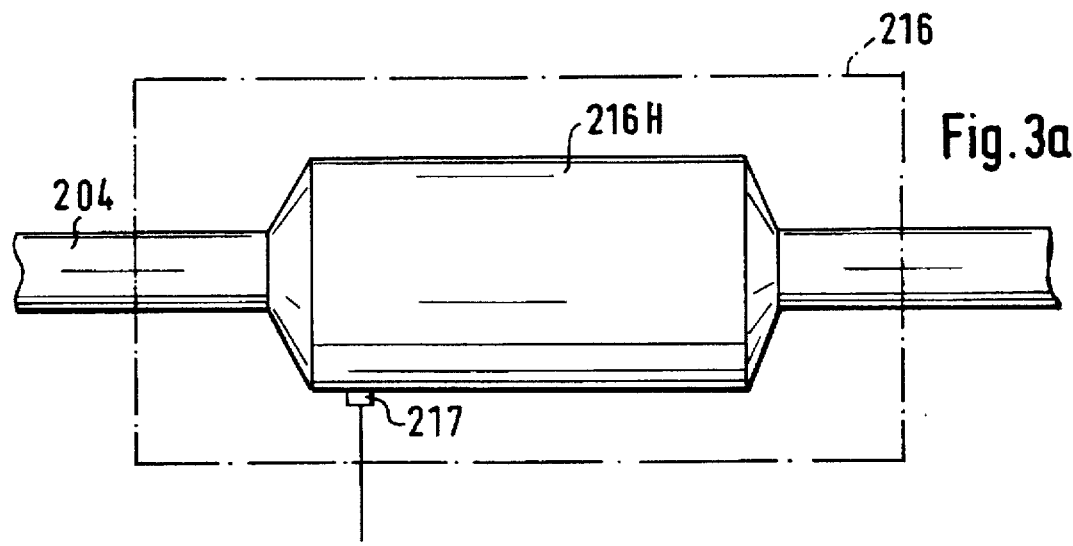
FIG. 3a illustrates a first possible location in a catalytic conversion system for arranging the temperature sensor.
Figure 3B:
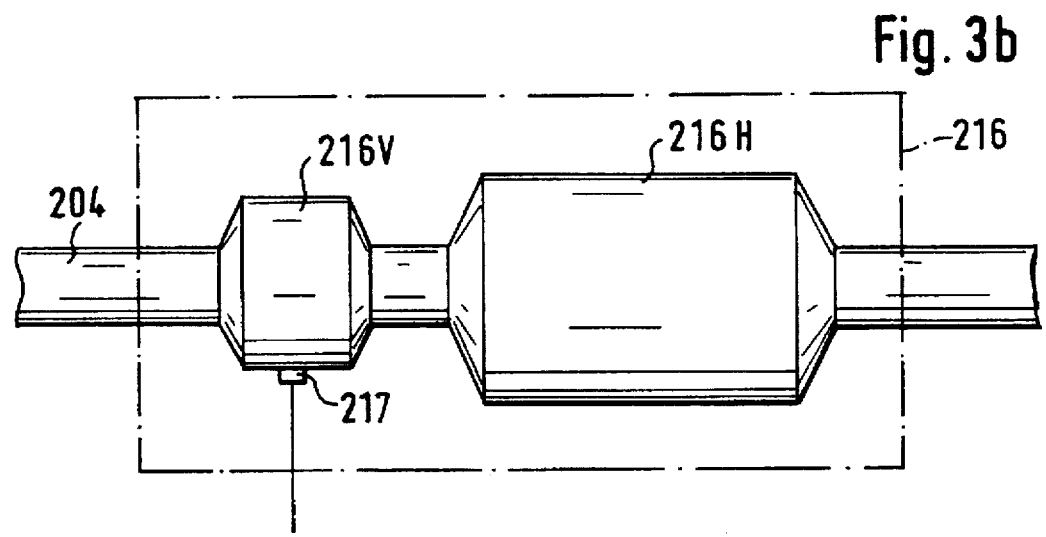
FIG. 3b illustrates a second possible location in a catalytic conversion system for arranging the temperature sensor.
Figure 3C:
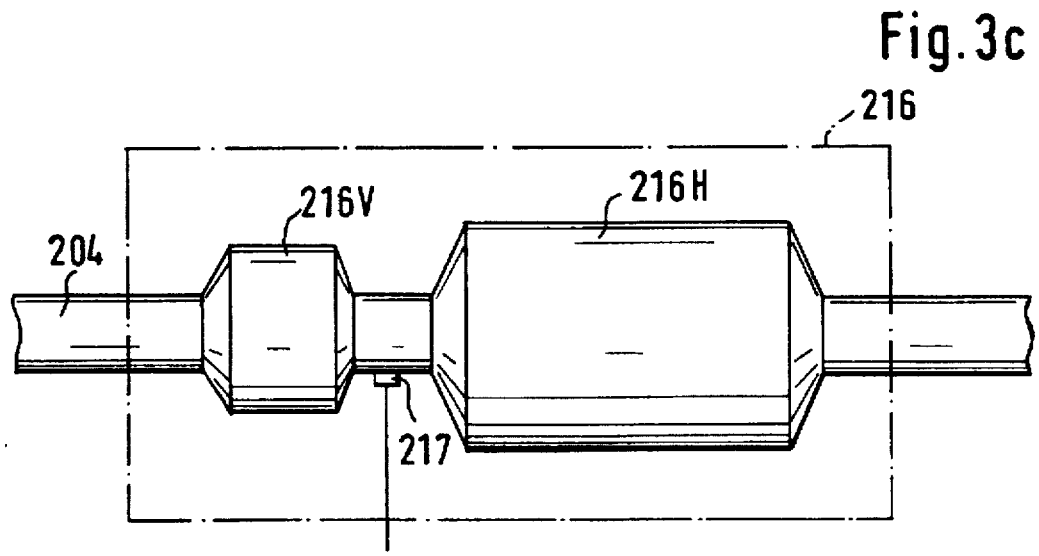
FIG. 3c illustrates a third possible location in a catalytic conversion system for arranging the temperature sensor.

Referring now to FIGS. 3a, 3b and 3c there is shown possible locations for depositing the temperature sensor 217 for different embodiments of the catalytic conversion system 216. FIG. 3a shows a catalytic conversion system 216 which consists of a main catalytic converter 216H. The temperature sensor 217 is arranged, seen in the direction of flow of the exhaust gases, in the front region of the main catalytic converter 216H. The catalytic conversion system 216 shown in FIGS. 3b and 3c consist in each case of a pre-catalytic converter 216V and a main catalytic converter 216H, the main catalytic converter 216H being arranged, seen in the direction of flow of the exhaust gas, behind the pre-catalytic converter 216V. In FIG. 3b, the temperature sensor 217 is arranged on the pre-catalytic converter. In FIG. 3c, the temperature sensor 217 is arranged in the exhaust-gas pipe 204 between the pre-catalytic converter 216V and the main catalytic converter 216H.

The catalytic conversion systems 216 shown in FIGS. 3a, 3b and 3c have the common feature that the temperature sensor 217 is arranged in each case in the region of the catalytic conversion system 216 which has the main influence on the warming-up emissions or directly downstream thereof. With due consideration to this condition, the method of the present invention can also easily be used in catalytic conversion systems 216 other than those shown in FIGS. 3a, 3b, and 3c.

Figure 4:
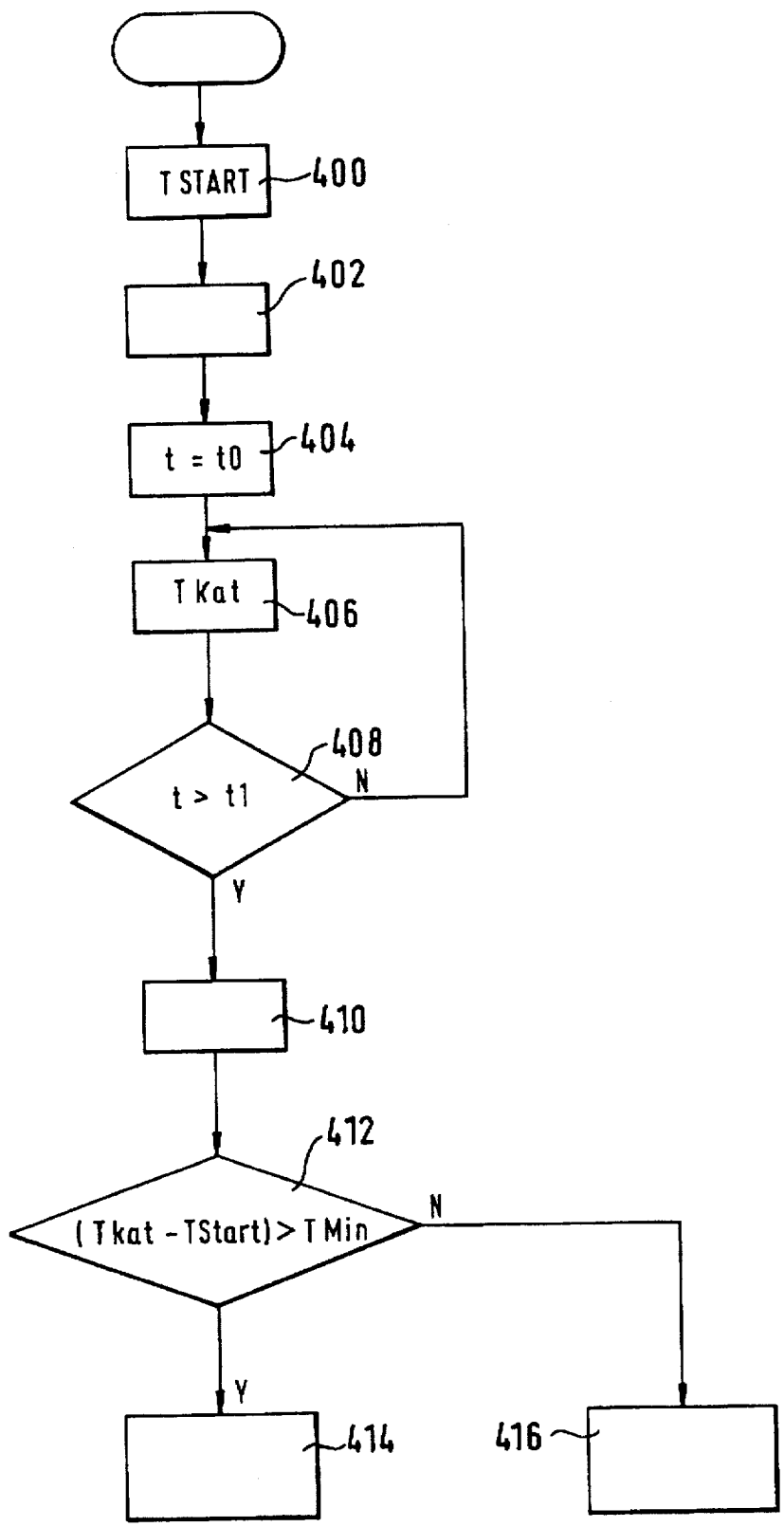
FIG. 4 illustrates a flowchart of a method according to the present invention.

Referring now to FIG. 4, there is shown a flowchart of the method of the present invention. The method of the present invention is suitable both for shop operation and for "on-board diagnosis" systems. In order to obtain reliable results, steady-state operating conditions should prevail for some time before, as well as during, the method shown in FIG. 4, and the catalytic conversion system 216 should be at operating heat.

In the embodiment described below, the conversion power of the catalytic conversion system 216 is determined from the difference between the temperature TKat of the starting region and the reference value TRef. As a reference value TRef there is used a temperature value TStart which represents the temperature TKat of the starting region which is detected directly prior to feeding the air/fuel mixture to the catalytic conversion system 216. The temperature value TStart is detected in a step 400. Thereupon, in a step 402, a mixture of air and unburned fuel is fed to the catalytic conversion system 216. This mixture can be produced, for instance, in a manner whereby the internal combustion engine 200 is operated with a rich air/fuel mixture, for instance with an air ratio of between 0.7 and 0.8, and secondary air is at the same time blown into the exhaust-gas pipe 204 by the secondary-air pump 222.

In this connection, the volume of secondary air should be sufficiently great that there is an excess of oxygen in front of the catalytic conversion system 216. To be sure, the volume of secondary air should also not be too great, so that there is no substantial cooling of the catalytic conversion system 216 by the stream of secondary air. Furthermore, the secondary air must be introduced into the exhaust-gas pipe 204 at a distance from the internal combustion engine which is sufficiently great to prevent self-ignition of the air/fuel mixture. Another possibility for supplying the catalytic conversion system 216 with an air/fuel mixture consists in making a part of the cylinders leaner and the remaining cylinders correspondingly richer. In the case of a four-cylinder engine, two cylinders can for instance be operated with an air ratio of 0.8 and two cylinders with an air ratio of 1.2. Other air ratios are also possible, whereby the air ratio in the exhaust gas in front of the catalytic conversion system should not be less than 1.

Step 402 is followed by a step 404 in which the timer is set to a value t=t0 (see also FIG. 1). Following step 404, there is a step 406, in which the instantaneous temperature TKat of the starting region of the catalytic conversion system 216 is detected and stored. It is then asked in step 408 whether the counter has a value t greater than t1.

If the answer is "no", there is then a jump back to step 406. On the other hand, if the answer to the query in step 408 is "yes", then a step 410 follows the step 408. In the step 410, the measures which have been introduced in step 402 for the production of an air/fuel mixture are terminated. Following step 410, there is a step 412 in which it is inquired whether the difference of the temperature values TKat and TStart determined in steps 406 and 400 is greater than a threshold value TMin, which is read from a read-only memory. If the answer is "yes", then the feed of the air/fuel mixture to the catalytic conversion system 216 has produced a sufficient increase in the temperature TKat of the starting region of the catalytic conversion system 216, and accordingly the catalytic conversion system 216 is operating properly. This determination is made in a step 414, which follows step 412, if the inquiry in step 412 is answered "yes". If the inquiry in step 412 is answered "no", then this is followed by a step 416. In step 416, it is determined that the catalytic conversion system 216 is not operating properly since there has not been a sufficient increase in the temperature TKat.

In the method described up to now, it is assumed that the internal combustion engine 200 is in a steady-state operating condition both for a time before the start of the method and during the carrying out of the method, i.e. load and speed of rotation of the internal combustion engine 200 are constant. On the other hand, if the load and/or the speed of rotation change directly before or during the carrying out of the method of the invention, then, in step 412, there is not formed the difference between the temperature TKat and the temperature value TStart determined in step 400, but, rather, a difference between the temperature TKat and a model value TMod determined from a temperature model. The temperature model describes the temperature of the starting region of the catalytic conversion system 216 as a function of the load and of the speed of rotation. The heat liberated upon the conversion is not considered in the temperature model (i.e. it is assumed that no conversion takes place in the starting region).

In order to increase the accuracy it is advisable to adapt the temperature TMod determined with the model and the temperature TKat measured with the temperature sensor 217 to each other shortly before step 402. This can be done by setting the model temperature TMod at the value of the measured temperature TKat or by adapting the measured temperature TKat to the model temperature TMod.

In another embodiment, the first derivative with respect to time of the temperature TKat can be evaluated in addition to or instead of the temperature difference TKat–TRef. Particularly in the case of high starting temperatures, there may initially be negative values for the first derivative with respect to time of the temperature TKat, despite a high converting power in the starting region of the catalytic conversion system 216. In order to avoid lengthy waiting times, one can, in this case, evaluate the second derivative with respect to time of the temperature TKat in addition to or instead of the first derivative with respect to time. The evaluation can be effected by comparison with table values.

A further embodiment contains, in addition to the temperature sensor 217, a further temperature sensor which is arranged in the exhaust-gas pipe 204, directly in front of the catalytic conversion system 216 and which detects the temperature with which the exhaust gas flows into the catalytic conversion system. This temperature of the exhaust gas can be used instead of the temperature TStart as reference value TRef.

In all embodiments, a function can be provided which delays the carrying out of the method of the invention by a predeterminable time if the starting temperature TStart exceeds a predeterminable threshold value. In the interim, the internal combustion engine 200 can be operated at idle, so that the catalytic conversion system 216 is cooled by the exhaust gas.

What is claimed is:

1. A method of monitoring a starting behavior of a catalytic conversion system of an internal combustion engine comprising the steps of:

continuously detecting a temperature of a starting region of the catalytic conversion system, wherein the starting region is a region of the catalytic conversion system which exerts primary influence on warming-up emissions;

feeding an air/fuel mixture to the catalytic conversion system; and after a predetermined time period, evaluating the starting behavior of the catalytic conversion system based upon effects which feeding the air/fuel mixture has on changes in the temperature of the starting region.

2. The method according to claim 1, wherein the starting behavior of the catalytic conversion system is evaluated by comparing a difference between the temperature of the starting region and a reference value with at least one threshold value, the reference value being a temperature of the starting region where no conversion of the air/fuel mixture takes place in the starting region.

3. The method according to claim 1, wherein the starting behavior of the catalytic conversion system is evaluated by comparing a first derivative with respect to time of the temperature of the starting region with at least one threshold value.

4. The method according to claim 1, wherein the starting behavior of the catalytic conversion system is evaluated by comparing a derivative with respect to time of an order greater than 1 of the temperature of the starting region with at least one threshold value.

5. The method according to claim 2, wherein the reference value corresponds to the temperature of the starting region immediately prior to feeding the air/fuel mixture.

6. The method according to claim 2, wherein the reference value corresponds to a temperature of exhaust gases upon entrance into the catalytic conversion system.

7. The method according to claim 2, wherein the reference value is determined using a temperature model which simulates a temperature of a non-converting starting region.

8. The method according to claim 1, wherein the catalytic conversion system operates at an operating temperature.

9. The method according to claim 1, wherein the steps are delayed, by a preselected time period when the temperature of the starting region exceeds a preselected threshold value upon start.

10. The method according to claim 1, wherein the steps are performed under steady-state conditions of the internal combustion engine.

11. The method according to claim 1, wherein the steps are performed when the internal combustion engine is in idling condition.

12. The method according to claim 1, wherein the steps are performed as part of an on-board diagnosis.

13. The method according to claim 1, wherein the steps are performed as part of a shop diagnosis.

14. A method of monitoring a starting behavior of a catalytic conversion system of an internal combustion engine comprising the steps of:
continuously determining a temperature of a starting region of the catalytic conversion system, wherein the starting region is a region of the catalytic conversion system which primarily affects warming-up emissions;
influencing an air/fuel mixture to the catalytic conversion system; and
after a predetermined time period, evaluating the starting behavior of the catalytic conversion system based upon a change in the temperature of the starting region of the catalytic conversion system caused by influencing the air/fuel mixture.

15. An apparatus for monitoring a starting behavior of a catalytic conversion system of an internal combustion engine comprising:
a temperature sensor for continuously detecting a temperature in a region of a catalytic conversion system which primarily affects warming-up emissions and for providing a temperature signal based thereon;
means for feeding an air/fuel mixture to the catalytic conversion system; and
an evaluation unit for evaluating changes in the temperature and the temperature signal provided by the temperature sensor after a predetermined time period.

16. The apparatus according to claim 15, wherein the temperature sensor is disposed in the region.

17. An apparatus for monitoring a starting behavior of a catalytic conversion system of an internal combustion engine comprising:
a temperature sensor for detecting a temperature in a region of a catalytic conversion system which primarily affects warming-up emissions and for providing a temperature signal based thereon, the temperature sensor being disposed downstream of the region;
means for feeding an air/fuel mixture to the catalytic conversion system; and
an evaluation unit for evaluating the temperature signal provided by the temperature sensor.

18. An apparatus for monitoring a starting behavior of a catalytic conversion system of an internal combustion engine comprising:
a temperature sensor for detecting a temperature in a region of a catalytic conversion system which primarily affects warming-up emissions and for providing a temperature signal based thereon, the catalytic conversion system including a single main catalytic converter, the temperature sensor being disposed in a front region of the main catalytic converter;
means for feeding an air/fuel mixture to the catalytic conversion system; and
an evaluation unit for evaluating the temperature signal provided by the temperature sensor.

19. The apparatus according to claim 15, wherein the catalytic conversion system includes a pre-catalytic converter and a main catalytic converter, the temperature sensor being disposed in the pre-catalytic converter.

20. The apparatus according to claim 15, wherein the catalytic conversion system includes a pre-catalytic converter and a main catalytic converter, the temperature sensor being disposed between the pre-catalytic converter and the main catalytic converter.

* * * * *